Patented May 17, 1932

1,858,843

UNITED STATES PATENT OFFICE

LE ROY U. SPENCE, OF BOSCOBEL, WISCONSIN, ASSIGNOR TO WESTINGHOUSE ELECTRIC & MANUFACTURING COMPANY, A CORPORATION OF PENNSYLVANIA

PROCESS FOR DRYING OIL VARNISHES

No Drawing.   Application filed August 25, 1927.   Serial No. 215,504.

This invention relates to a method of drying varnish films, more particularly those of the oleo-resinous type, by means of ozonized air.

An object of the invention is to provide a novel method of decreasing the time necessary for drying varnish films without impairing their quality and one that finds special adaptation in hastening the drying of films applied to conductors, cotton tape and other accessories entering into the manufacture of electrical machinery.

The present method of drying varnish films is unduly time-consuming. Space and equipment are utilized for long periods of time, making quantity production low and, consequently, increasing the operating cost.

Another object of the invention is to produce a varnish film in a considerably less time than has previously been accomplished, which is perfectly smooth, is of low acidity, has high dielectric strength, is impervious to oil and moisture and has remarkable endurance under the strain of severe heat.

Varnishes consisting of a drying oil, a resin and a volatile thinner are generally termed oil varnishes and are used almost universally in the electrical industry, where they may be classified as insulation varnishes. The drying of varnishes of this type, after being applied to an article, is a slow process, as the oxidation of the oil forms a hard impervious film, but at a slow rate.

Various methods have been tried to shorten the drying time without impairing the efficiency of the varnish, such as partial oxidation of the oils before they are mixed with the varnish and the addition of metallic dryers, such as the metallic soaps of oil or resin acids.

Elevated temperatures hasten the evaporation of the thinner and also accelerate the oxidation of the oil but such temperatures have a tendency to cause deterioration of the oil and resin, so that a film obtained in this manner is often of an inferior quality, and care must be exercised to keep the temperature below the boiling point of the thinner, as the use of such a baking heat causes a rapid evolution of the vapors of the thinner, resulting in a crazed and blistered film.

It has also been proposed to use ozonized air, at an elevated temperature, for drying varnish films, and experiments indicate that a considerable saving of time may be effected by this method, but the surface of the film thus produced is found to be wrinkled, and the varnish beneath the outer coat is soft. I have made the discovery, however, that, if the film is first baked for a short period of time in a current of dry air and afterwards subjected to a current of ozonized air at an elevated temperature, the time of drying will be diminished and a dried film will be produced which will be smooth and compares favorably, in its physical characteristics, with a film produced by the slower process of baking in air.

A short survey of the transitions that take place in the drying of a varnish will give some insight into the merits of my discovery. In the normal course of the drying of a baking varnish, the first step in the process is the gradual evaporation of the thinner, accompanied by slow oxidation of the drying oil. When the thinner has evaporated, the varnish film undergoes a very slight volume change in passing to the hardness stage. The tendency is for oxidation to take place slowly and to proceed inwardly from the outside of the film. This produces a hard-surface film, affording protection from corrosive agents and acting as a dielectric material, and an inner portion which is softer and serves as a flexible base between the coated article ad the surface film. This flexible base is of great importance, since it allows bending and prevents stripping of the varnish which might occur if a brittle film of low adhesive power and low plasticity were directly attached to the article.

In the ozone process of drying, oxidation proceeds at a much more rapid rate than in the air baking process, and, immediately upon placing a varnished article in the ozonized air, oxidation begins at the accelerated rate, and a surface film is formed before the thinner is completely evaporated. The film is distended by the pressure of the vapors and, upon the final evaporation of the thinner, the outer film shrinks to fit the final volume, thus causing the wrinkling to which reference has previously been made. In order to obviate this difficulty, I have found that the varnished article must reach temperature equilibrium, and a substantial part, preferably a major part, of the thinner must be evaporated before the introduction of ozone into the oven.

The following specific procedure, as applied to the drying of varnished articles, will illustrate and explain the essential features of my invention. A varnish of the oleo-resinous type, containing a vegetable oil, a gum or resin and a volatile thinner, is applied to the article by dipping, brushing or spraying in the usual manner and allowed to stand in the air until an impression made by the finger is not obliterated in ten minutes. At this stage, the varnish is said to be free from flow. The varnished article is then transferred to an electrically heated oven, which is provided with openings through which a current of air may be forced and maintained at a temperature between 100 and 110 degrees C. by the heat of the oven, until most of the thinner has evaporated, and the varnish is of such a consistency that it will not be indented by a light pressure on the surface but is still sticky and adherent. At this point, the varnish is designated as being at the tacky stage.

A current of ozonized air is now passed through the electrically heated oven, which is still maintained at a temperature of 100 to 110 degrees C. The concentration of the ozone may range from .1 per cent to 1 per cent, but a concentration of 0.5 per cent is considered the most favorable.

When the varnished article is dry (for methods of determination, see A. S. T. M. 1925), it is removed from the oven, and a film as smooth in appearance as an air-baked film is thus obtained in a considerably less time, and possessing all of its favorable qualities, such as low acidity, high dielectric strength, imperviousness to oil and moisture and the ability to stand the strain of the severe heat to which insulation varnishes are being constantly subjected.

The drying time tests were obtained by first preparing five varnishes having the following characteristics:

| Varnish gum | Oil ratio 100 lbs. gum | Sp. gr. 20° C. | Non-volatile % by wt. | Thinner % by vol. |
|---|---|---|---|---|
| 1. Rosin ester | 20 gal | 0.847 | 49.8 | 58.5 |
| 2. Asphalt | 2 gal | 0.832 | 50.4 | 55.5 |
| 3. Copal | 30 gal | 0.832 | 45.0 | 61.2 |
| 4. Asphalt | 25 gal | 0.844 | 53.9 | 52.1 |
| 5. Copal | 12 gal | 0.850 | 54.7 | 50.0 |

Copper strips were dipped in the thin varnish, withdrawn slowly and uniformly, allowed to drain for ½ hour and where then transferred to an electrically heated oven and baked in dry air for 10 minutes at a temperature of 110 degrees. At the end of this period, air containing 0.9 per cent ozone was passed through the oven at the rate of 7 liters per minute. Samples were removed after five minutes of ozonization, and every three minutes thereafter, and tested for dryness after cooling to room temperature. The time of drying was calculated from the time the samples were placed in the oven and included the prebaking period with dry air.

In order to determine the drying time in dry air alone, copper strips of the same size were next dipped into the same varnish and subjected to the same treatment as the previous strips, with the exception that the complete drying process was carried out in dry air, instead of partially with dry air and partially with ozonized air.

The following table indicates the saving in time which can be accomplished by baking in ozonized air having a concentration of 0.9 per cent ozone, with a preliminary baking in dry air, as compared with the time required for baking in dry air alone.

Time of drying varnishes baked in air and in ozone

| Varnish | 1 | 2 | 3 | 4 | 5 |
|---|---|---|---|---|---|
| Air baked | 50 min. | 70 min. | 80 min. | 90 min. | 50 min. |
| Baked in air ten minutes then in 0.9% ozonized air | 18 min. | 24 min. | 21 min. | 21 min. | 18 min. |

Similar tests were made when ozonized air having concentrations of .5 per cent ozone and .1 per cent ozone were employed. When the ozone concentration is reduced, the period of prebaking in air may also be reduced; for example, with an ozone concentration of .5 per cent, the prebaking period in air may be reduced to six minutes and with an ozone concentration of .1 per cent, the prebaking period in air may be reduced to four minutes. A slightly longer period of treatment with ozonized air is required when the concentration of the ozone is decreased, but the time necessary for prebaking in air is also decreased, so that the total time required for drying the film is almost the same. The time required for the complete drying of a film with ozonized air having a concentration of .1 per cent, including the prebaking period of four minutes in air, averaged only two to three minutes longer than the drying time required using ozone having a concentration of .9 per cent.

Further tests were made on the above-identified No. 3 varnish to determine more accurately the decrease in time by baking in ozonized air as compared with the drying time by baking in air alone. The measurements where made by means of a swinging-beam hardness tester. Fourteen samples of copper, of exactly the same size, were thoroughly cleaned and dipped into No.

3 varnish having a specific gravity of .840 at 24 degrees C., and hung to drain. After draining had ceased, seven samples were suspended in an electrically heated oven of such design that dry air could be forced through, and the other seven samples were placed in an electrically heated oven so designed that either dry air or ozonized air could be forced through. The samples treated with ozonized air were first baked in air without ozone for a period of 15 minutes and then in ozonized air having a concentration of 0.4 percent. The following tables indicate the increase in hardness for the same period of time by the use of ozonized air, as compared with the use of dry air alone, and this time, as given in the tables, also includes the preliminary baking in air.

| Hours baked | Hardness—seconds | | Difference | Hardness % increase |
|---|---|---|---|---|
| | Air oven | Ozone oven | | |
| ½ | 13.0 | 19.3 | 6.3 | 48.5 |
| 1 | 16.9 | 41.6 | 24.7 | 146.0 |
| 2 | 19.0 | 58.7 | 39.7 | 209.0 |
| 4 | 24.1 | 82.9 | 58.8 | 244.0 |
| 7 | 29.0 | 121.3 | 92.3 | 318.0 |

The following table shows the decrease in hardening time by application of ozonized air:

| Hardness—seconds | Baking time—hours | | Difference | % decrease in time |
|---|---|---|---|---|
| | Air oven | Ozone oven | | |
| 11.3 | .3 | .25 | .05 | 16.6 |
| 15 | .75 | .37 | .38 | 50.0 |
| 20 | 2.4 | .50 | 1.90 | 79.2 |
| 25 | 4.5 | .57 | 3.93 | 87.4 |
| 30 | 7.3 | .63 | 6.67 | 91.4 |
| 35 | 8.78 | .68 | 8.10 | 92.3 |
| 40 | 10.2 | .74 | 9.46 | 92.8 |
| 63.5 | 17.0 | 2.42 | 14.58 | 85.7 |

The tables indicate clearly that a marked saving in time results from the use of ozonized air to obtain the same result, or a substantial increase in hardness may be obtained in the same time, and, when the preliminary air baking is utilized, a smooth film, possessing all the favorable qualities of an air baked film, is obtained.

In summarizing the results of the experiments given above, it will be observed from the description and from the tables, that the period of prebaking in air is dependent upon the concentration of the ozone in the air subsequently used. Higher concentrations of ozone require a longer preliminary baking, while a lower concentration of ozone permits a shorter preliminary baking in air.

The term "oven" as used in the claims is not confined to an electrically heated oven, but any container or receptacle, heated internally or externally, that is capable of maintaining a current of air forced through it at a predetermined temperature, may be utilized. The composition of the varnish and the nature of the gum or thinner used are not of vital importance, but the process may be utilized in effecting the drying of any oil varnish containing either natural or synthetic resins and diluted by any appropriate thinner to suit any particular requirements.

The drying of varnish films, either in dry air or in ozonized air, as hereinbefore outlined, is not limited to the temperature ranges mentioned, as higher or lower temperatures may be used. A temperature range of 100 to 110° C., however, is considered the most favorable. Lower temperatures require a longer time, and, at higher temperatures, there is a tendency toward deterioration of the oil and resin, so that the film obtained is often of an inferior quality.

While numerous examples have been given, and I have described my method in considerable detail, I desire it to be understood that I do not limit myself to the specific examples given, but wish to claim broadly the idea of drying varnishes by means of ozonized air which have previously been prebaked or dried for a limited period in air.

I claim as my invention:

1. The method of drying a varnish film which comprises subjecting a film-coated article to a preliminary baking in air at a temperature of 100 to 110 degrees C. until the varnish is of such consistency that it will not be indented by a light pressure but is still sticky and adherent, and then subjecting said film-coated article to ozonized air at a temperature of from 100 to 110 degrees C. until the varnish is dry.

2. The method of drying a varnish film which comprises subjecting a film-coated article to a preliminary baking in air at a temperature of 100 to 110 degrees C. until the varnish reaches a tacky stage and then subjecting said article to ozonized air having a concentration of 0.1 to 1.0 per cent at a temperature of 100 to 110 degrees C. until the varnish is completely dry.

3. The method of drying a varnish film which comprises subjecting a film-coated article to a preliminary baking in air at a temperature of 100 to 110 degrees C. until said film reaches the tacky stage and then subjecting it to ozonized air having a concentration of 0.1 to 0.9 per cent ozone until said film is dry.

4. The method of drying a varnish film which comprises placing a film-coated article in an oven, forcing air through said oven at an elevated temperature for a period of from 4 to 15 minutes, and then forcing ozonized air, at an elevated temperature and having a concentration of from 0.1 to 0.9 per cent ozone, through said oven until said film is dry, the temperature of said air being regulated by the heat of said oven.

5. The method of drying a varnish film which comprises placing a film-coated article in an oven, forcing air through said oven at a temperature of 100 to 110 degrees C. for a period of from 4 to 15 minutes and then forcing a current of ozonized air having a concentration of from 0.1 to 0.9 per cent ozone through said oven until said film is dry, the temperature of said air being regulated by the heat of said oven.

In testimony whereof, I have hereunto subscribed my name this thirteenth day of August, 1927.

LE ROY U. SPENCE.